(12) United States Patent
Gan et al.

(10) Patent No.: US 11,567,370 B2
(45) Date of Patent: Jan. 31, 2023

(54) DISPLAY SUBSTRATE AND MANUFACTURING METHOD THEREOF, AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Quan Gan, Beijing (CN); Yisan Zhang, Beijing (CN); Yangyang Hu, Beijing (CN); Yongcan Wang, Beijing (CN); Fengzhen Lv, Beijing (CN); Shuai Huang, Beijing (CN); Haifeng Wang, Beijing (CN)

(73) Assignees: HEFEI XINSHENG OPTOELECTRONICS TECHNOLOGY CO., LTD, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 62 days.

(21) Appl. No.: 16/767,413

(22) PCT Filed: Oct. 28, 2019

(86) PCT No.: PCT/CN2019/113578
§ 371 (c)(1),
(2) Date: May 27, 2020

(87) PCT Pub. No.: WO2020/088383
PCT Pub. Date: May 7, 2020

(65) Prior Publication Data
US 2020/0387036 A1    Dec. 10, 2020

(30) Foreign Application Priority Data

Oct. 29, 2018  (CN) .......................... 201811271605.9

(51) Int. Cl.
*G02F 1/1337* (2006.01)
*G02F 1/1335* (2006.01)
(Continued)

(52) U.S. Cl.
CPC .. *G02F 1/133784* (2013.01); *G02F 1/133528* (2013.01); *G02F 1/133707* (2013.01);
(Continued)

(58) Field of Classification Search
CPC ......... G02F 1/133784; G02F 1/133707; G02F 1/133528; G02F 1/134336; G02F 1/134363; G02F 1/1368; G02F 2201/123
See application file for complete search history.

(56) References Cited

U.S. PATENT DOCUMENTS

2005/0237462 A1  10/2005  Nguyen et al.
2009/0021660 A1   1/2009  Lu et al.
(Continued)

FOREIGN PATENT DOCUMENTS

CN    101424806 A    5/2009
CN    101526686 A    9/2009
(Continued)

OTHER PUBLICATIONS

First office action of Chinese application No. 201811271605.9 dated Apr. 8, 2020.
(Continued)

*Primary Examiner* — James A Dudek
(74) *Attorney, Agent, or Firm* — Fay Sharpe LLP

(57) ABSTRACT

A display substrate is provided. The display substrate includes an alignment film and a plurality of rows of pixel units arranged in a first direction. Each row of pixel units includes a plurality of pixel units arranged in a second direction. The second direction intersects with the first direction, and the angle between a rubbing direction of the
(Continued)

alignment film and the first direction is an acute angle. By setting the angle between the rubbing direction of the alignment film of the display substrate and the first direction to be an acute angle, the contrast of a specific orientation of the display device can be changed.

19 Claims, 7 Drawing Sheets

(51) Int. Cl.
  *G02F 1/1343* (2006.01)
  *G02F 1/1368* (2006.01)
(52) U.S. Cl.
  CPC ...... *G02F 1/134336* (2013.01); *G02F 1/1368* (2013.01); *G02F 1/133531* (2021.01); *G02F 1/134363* (2013.01); *G02F 2201/123* (2013.01)

(56) References Cited

U.S. PATENT DOCUMENTS

| | | | |
|---|---|---|---|
| 2009/0115712 A1 | 5/2009 | Morimoto et al. | |
| 2009/0322995 A1 | 12/2009 | Yonemura et al. | |
| 2011/0012821 A1 | 1/2011 | Ogura et al. | |
| 2014/0253820 A1 | 9/2014 | Okumura | |
| 2016/0011458 A1 | 1/2016 | Xu et al. | |
| 2016/0033826 A1 | 2/2016 | Guo et al. | |
| 2021/0286219 A1* | 9/2021 | Yoshida | G09F 9/30 |

FOREIGN PATENT DOCUMENTS

| | | |
|---|---|---|
| CN | 101620332 A | 1/2010 |
| CN | 101930138 | 12/2010 |
| CN | 101978314 A | 2/2011 |
| CN | 102621753 A | 8/2012 |
| CN | 102799030 | 11/2012 |
| CN | 103488011 A | 1/2014 |
| CN | 103645590 | 3/2014 |
| CN | 104020615 | 9/2014 |
| CN | 104267547 A | 1/2015 |
| CN | 109188784 | 1/2019 |
| JP | 2008158330 A | 7/2008 |

OTHER PUBLICATIONS

International Search Report and Written Opinion for corresponding PCT Application No. PCT/CN2019/113578 filed Oct. 28, 2019.
Third office action of Chinese application No. 201811271605.9 dated Mar. 12, 2021.

* cited by examiner

DISPLAY SUBSTRATE AND MANUFACTURING METHOD THEREOF, AND DISPLAY DEVICE

This application is a 371 of PCT Application No. PCT/CN2019/113578, filed on Oct. 28, 2019, which claims priority to Chinese Patent Application No. 201811271605.9, filed on Oct. 29, 2018 and entitled "DISPLAY SUBSTRATE AND MANUFACTURING METHOD THEREOF, AND DISPLAY DEVICE", the entire contents of which are incorporated herein by reference.

TECHNICAL FIELD

The present disclosure relates to the field of display technology, and more particularly to a display substrate and a manufacturing method thereof, and a display device.

BACKGROUND

A liquid crystal display has become a widely used display device due to multiple advantages. The liquid crystal display mainly includes a liquid crystal display panel and a backlight module. The liquid crystal display panel generally includes a display substrate, a color filter substrate and a liquid crystal layer. The liquid crystal layer is sandwiched between the display substrate and the color filter substrate which are oppositely disposed.

SUMMARY

In one aspect, embodiments of the present disclosure provide a display substrate including an alignment film and a plurality of rows of pixel units arranged in a first direction, wherein each row of pixel units includes a plurality of pixel units arranged in a second direction, the second direction intersects with the first direction, and an angle between a rubbing direction of the alignment film and the first direction is an acute angle.

In another aspect, embodiments of the present disclosure further provide a display substrate. The display substrate includes:

a base substrate, a common electrode layer located on the base substrate, an insulating layer located on the common electrode layer, and an array layer and an alignment film which are located on the insulating layer in sequence; wherein the array layer includes a plurality of scanning lines, a plurality of data lines, and a plurality of rows of pixel units arranged in a first direction, each row of pixel units includes a plurality of pixel units arranged in a second direction, the second direction intersects with the first direction, the plurality of scanning lines and the plurality of data lines intersect with each other to define a plurality of pixel regions, and each pixel region has one pixel unit;

each of the pixel units includes a thin film transistor and a pixel electrode, a first electrode of the thin film transistor is connected to the data line, a second electrode of the thin film transistor is connected to the pixel electrode, a control electrode of the thin film transistor is connected to the scanning line, and the first electrode and the second electrode are one of a source electrode and a drain electrode respectively;

each of the pixel electrodes has a first region and a second region which are arranged in the second direction, the first region is provided with a plurality of first bar slits, the second region is provided with a plurality of second bar slits, and an extending direction of the first bar slit is different from an extending direction of the second bar slit; and the angle between a rubbing direction of the alignment film and the first direction is an acute angle, and the extending direction of the first bar slit and the extending direction of the second bar slit are symmetrical with respect to the rubbing direction of the alignment film.

In another aspect, embodiments of the present disclosure further provide a display device. The display device includes a first substrate, and the first substrate is the display substrate described above.

In yet another aspect, embodiments of the present disclosure further provides a method for manufacturing a display substrate. The method includes:

forming a plurality of rows of pixel units arranged in a first direction on a base substrate, each row of pixel units including a plurality of pixel units arranged in a second direction, the second direction intersecting with the first direction; and forming an alignment film on the base substrate, the angle between a rubbing direction of the alignment film and the first direction being an acute angle.

DETAILED DESCRIPTION

For clearer descriptions of the objects, technical solutions and advantages in the present disclosure, the present disclosure is described in detail below in combination with the accompanying drawings.

In the embodiment of the present disclosure, the rubbing direction of an alignment film is the length direction of a channel on the alignment film, and may also be referred to as the channel direction of the alignment film, or the alignment direction of the alignment film.

Figure 1:
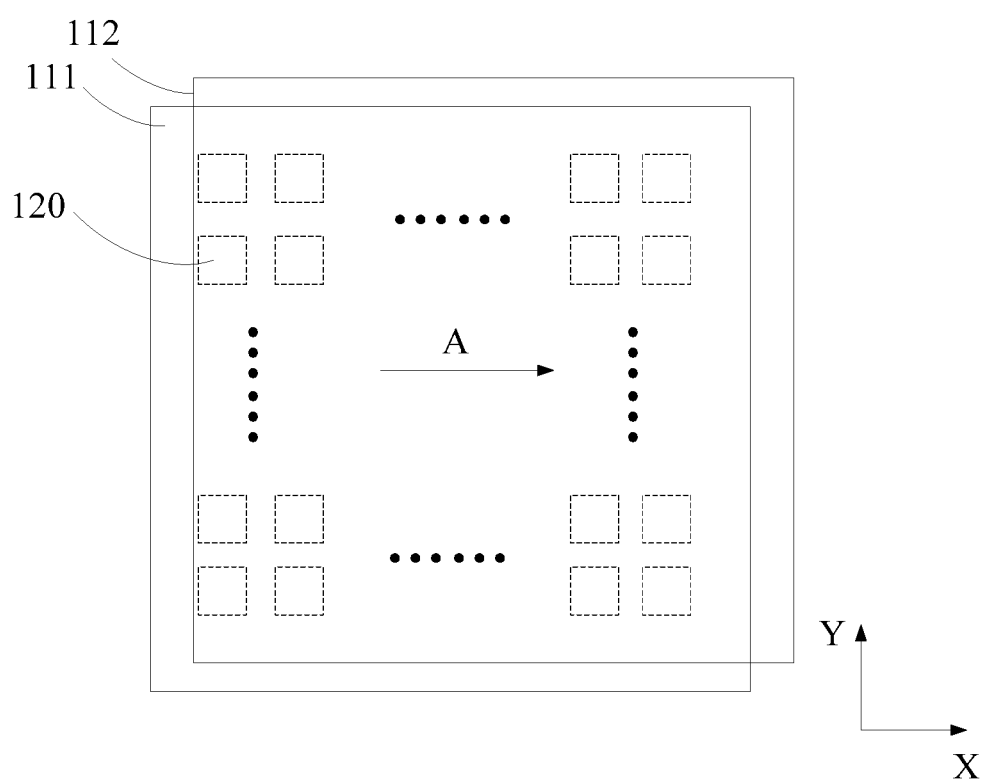
FIG. 1 is a schematic diagram of a partial structure of a display substrate in the related art.

FIG. 1 is a schematic diagram of a partial structure of a display substrate in the related art. As shown in FIG. 1, the display substrate includes a base substrate 111, an alignment film 112, and a plurality of rows of pixel units 120 arranged in a first direction (for example, the X direction in FIG. 1). Each row of pixel units 120 includes a plurality of pixel units 120 arranged in a second direction (for example, the Y direction in FIG. 1), The second direction intersects with the first direction, for example, the second direction is perpendicular to the first direction, or the second direction is substantially perpendicular to the first direction. The rubbing direction of the alignment film 112 (for example, the A direction in FIG. 1) is in the first direction.

Figure 2:
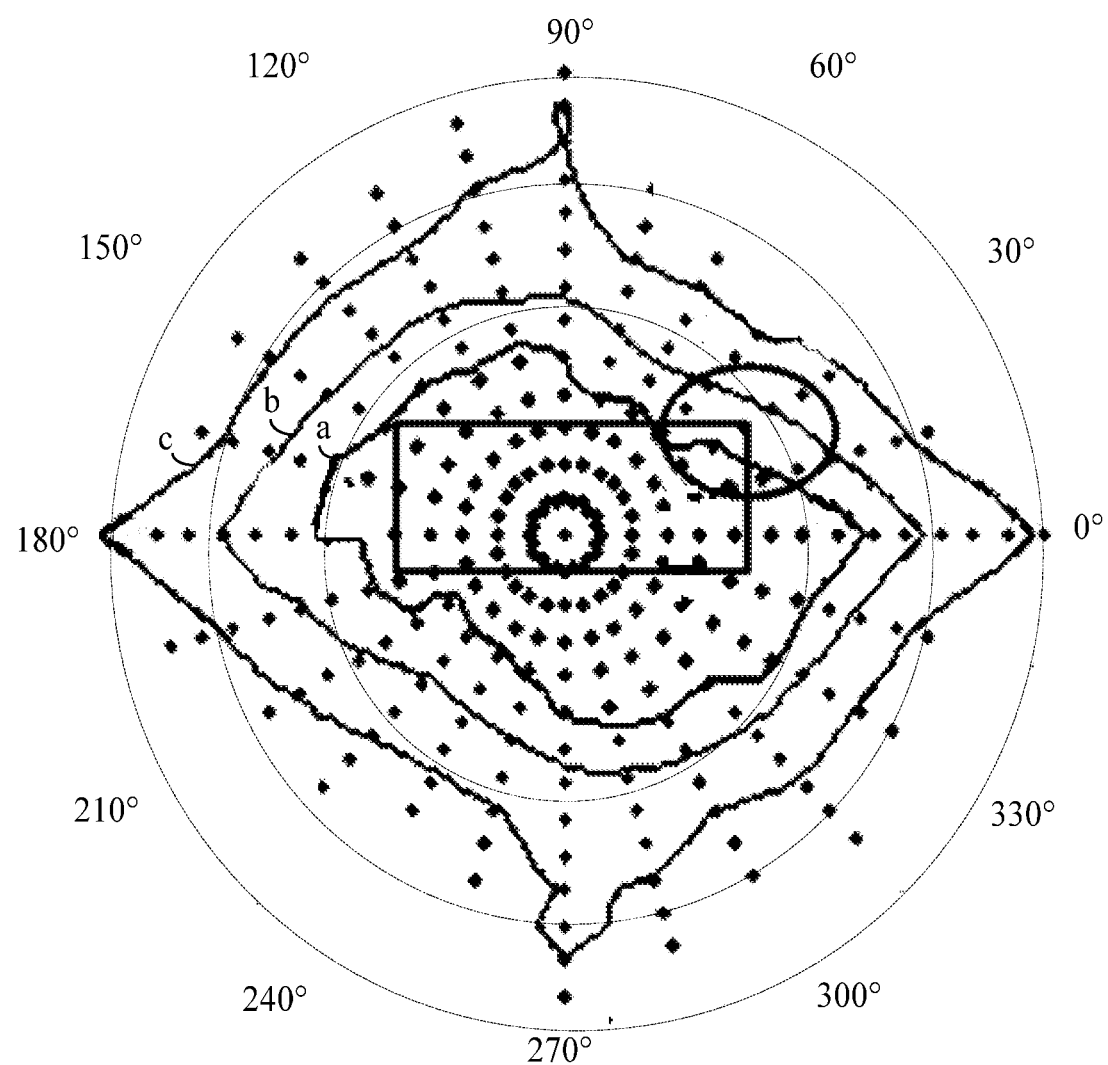
FIG. 2 is a diagram of a contrast test result of a display device in the related art.

FIG. 2 is a diagram of a contrast test result of a display device in the related art. The display device includes the display substrate shown in FIG. 1. FIG. 2 shows three iso-contrast lines a, b, and c. When the display device is viewed at any position on the same iso-contrast line, the contrast of a screen is the same. The closer the iso-contrast line to the center, the higher the corresponding contrast. The figures surrounded by the iso-contrast lines a, b, and c are not symmetrical figures due to the factors that that liquid crystal molecules in the display device have a pretilt angle (the pretilt angle is an angle between the liquid crystal molecules in a plane perpendicular to the display substrate and the display substrate), there are errors (for example, the difference between an angle between the rubbing directions of two alignment films on both sides of the liquid crystal layer and a desired angle) in a manufacturing process, and the like.

Figure 3:
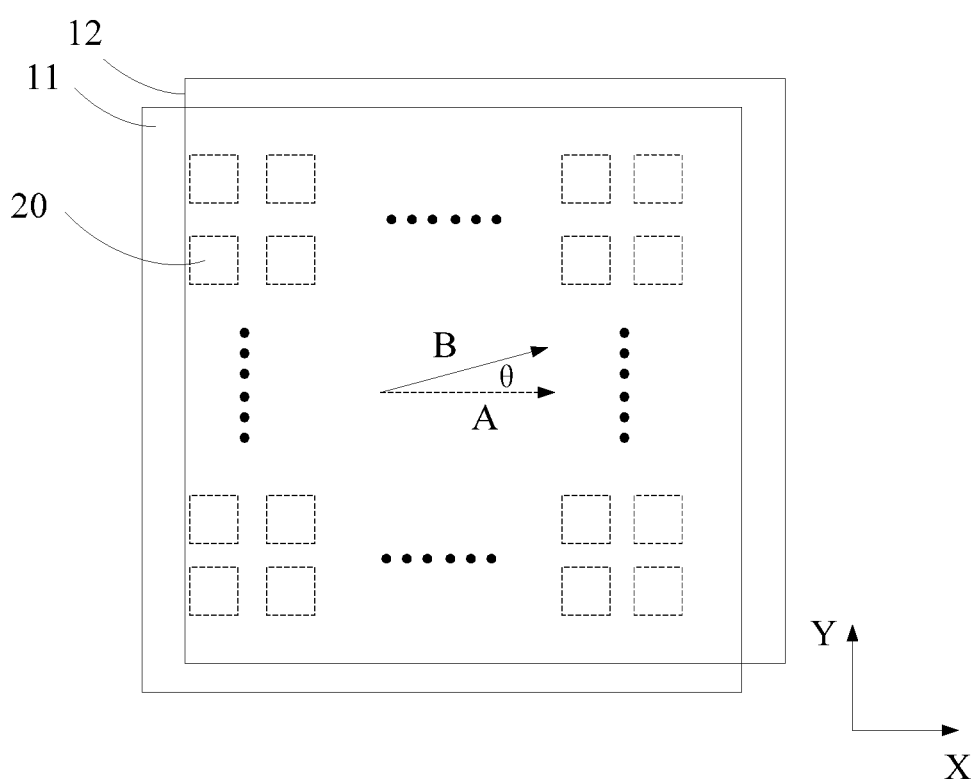
FIG. 3 is a schematic diagram of a partial structure of a display substrate according to an embodiment of the present disclosure.

With the center of the screen of the display device as the original point, within the viewing angle range of 40° on the left and right sides of the display device, 20° on the upper side of the display device, and 10° on the lower side (i.e., the region shown by the rectangle in FIG. 2), the contrast in most places meets the design requirements, but only the contrast of a small region (for example, the region surrounded by the elliptical line in FIG. 2) located at the upper right corner is lower than the design requirements (lower than the contrast corresponding to the iso-contrast line a). Therefore, when viewed in the region shown by the rectangle, the contrast of the display device cannot meet the requirements of a user, FIG. 3 is a schematic diagram of a partial structure of a display substrate according to an embodiment of the present disclosure. As shown in FIG. 3, the display substrate includes an alignment film 12 and a plurality of rows of pixel units 20 arranged in a first direction (for example, the X direction in FIG. 3). Each row of pixel units 20 includes a plurality of second pixel units 20 arranged in a second direction (for example, the Y direction in FIG. 3). The second direction intersects with the first direction, for example, the second direction is perpendicular to the first direction, or the second direction is substantially perpendicular to the first direction. The angle θ between the rubbing direction (for example, the direction B in FIG. 3) of the alignment film 12 and the first direction is an acute angle.

Here, one of the first direction and the second direction may be a line direction in which the pixel units are arranged, and the other may be a column direction in which the pixel units are arranged. For example, when the row is a line, the first direction is a column direction, and the second direction is a line direction. When the row is a column, the first direction is a line direction, and the second direction is a column direction.

Both the pixel unit 20 and the alignment film 12 may be located on the base substrate 11. FIG. 3 only shows a partial structure of the display substrate. The shape of the actual display substrate is not necessarily a rectangle. For example, the display substrate may also be other polygon besides a rectangle, or a circle or an oval.

In the embodiment of the present disclosure, by setting the angle between the rubbing direction of the alignment film of the display substrate and the first direction to be an acute angle, the liquid crystal molecules are rotated by an angle (that is, the angle of the above angle) with respect to the first direction in a plane parallel to the display substrate. Since the orientation of the liquid crystal molecules is rotated as a whole, during the observation at the specific orientation of a liquid crystal display device, the refractive effect of the liquid crystal layer for the light changes, thereby changing the contrast of the specific orientation.

Figure 4:
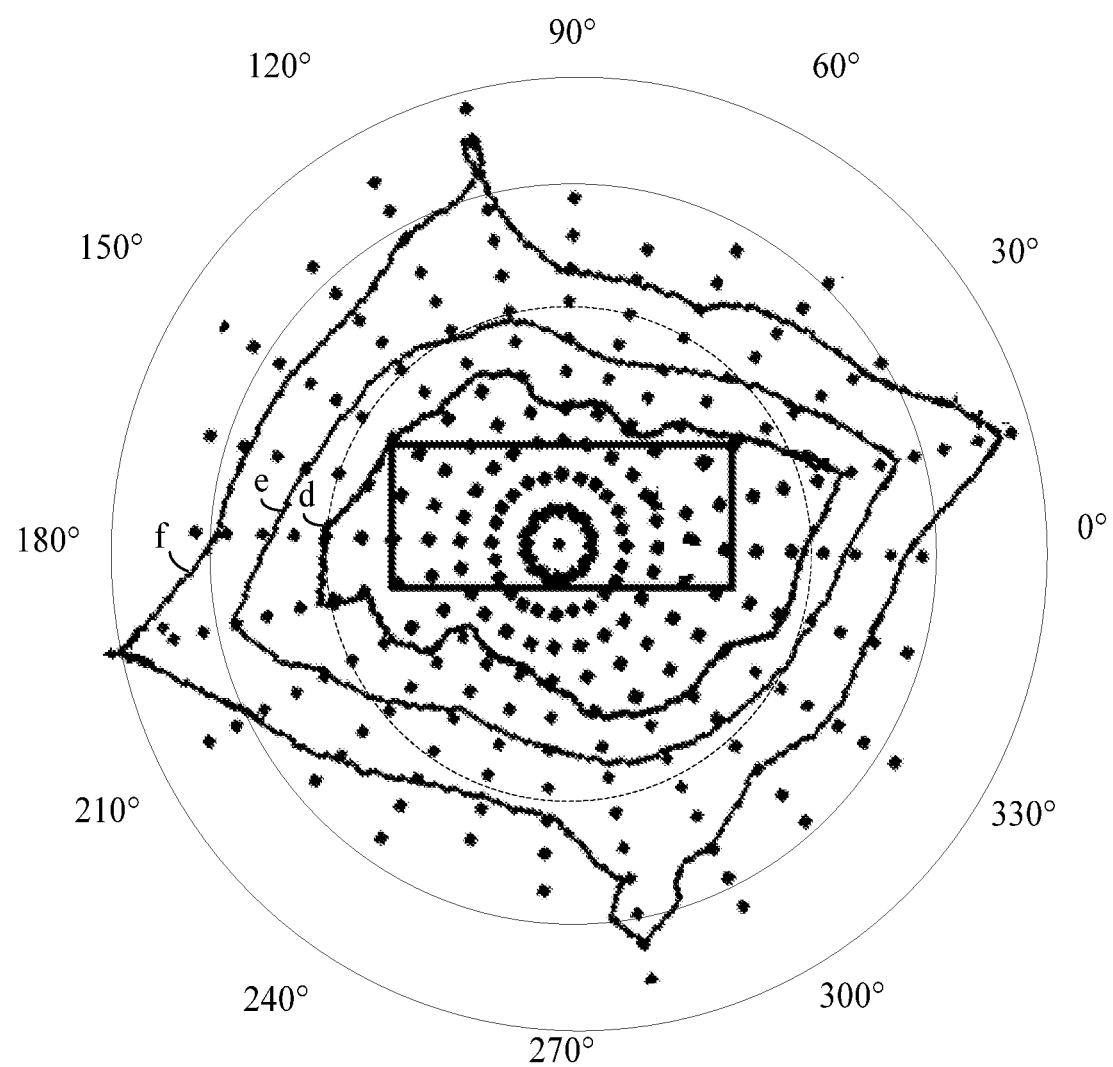
FIG. 4 is a diagram of a contrast test result of a display device according to an embodiment of the present disclosure.

The display substrate shown in FIG. 3 is applied to the display device to perform a contrast test, and FIG. 4 is a diagram of a contrast test result of the display device according to an embodiment of the present disclosure. The drawing shows three iso-contrast lines d, e, f, and the contrasts corresponding to the three iso-contrast lines d, e, f are respectively equal to those corresponding to the three iso-contrast lines a, b, c, By comparing FIG. 4 and FIG. 2, the shapes of the three iso-contrast lines d, e, and fin FIG. 4 are basically the same as the shapes of the three iso-contrast lines a, b, and c in FIG. 2. Compared with the display substrate shown in FIG. 1, the rubbing direction of the alignment film 12 of the display substrate in FIG. 3 is rotated by an angle, that is, the angle θ, so that the liquid crystal molecules are rotated by the same angle as a whole in the plane parallel to the display substrate. Therefore, the three iso-contrast lines d, e, f obtained by testing are also rotated by the same angle as a whole. After the rotation, the contrast of the region not meeting the contrast requirements is improved (for example, the upper right corner of the rectangle shown in FIG. 4 is also within the iso-contrast line d). Although the contrasts of other regions will also change, the contrasts after the change are within the required range, so the overall contrast of the display device can meet the needs.

Exemplarily, the angle θ may be 1° to 2° (the angles shown in FIG. 3 and FIG. 4 are only schematic). Through the contrast test of the actual product, it is found that when the angle θ is between 1° and 2°, the contrast of the product at a specific angle can meet the design requirements.

Optionally, the display substrate may be an array substrate, and each pixel unit may include one pixel electrode.

Figure 5:
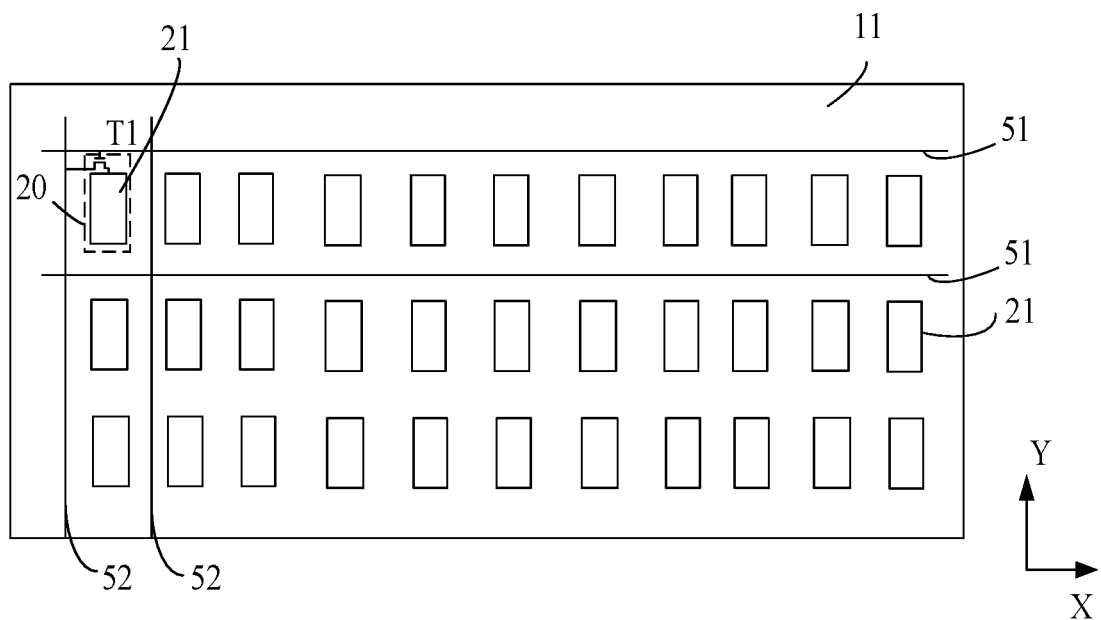
FIG. 5 is a schematic diagram of a partial structure of a display substrate according to an embodiment of the present disclosure.

FIG. 5 is a schematic diagram of a partial structure of a display substrate according to an embodiment of the present disclosure. As shown in FIG. 5, the display substrate may include a base substrate 11, and a plurality of scanning lines 51, a plurality of data lines 52, and a plurality of pixel units 20 which are disposed on the base substrate 11. The plurality of scanning lines 51 intersect with the plurality of data lines 52 to define a plurality of pixel regions, and one pixel unit 20 is arranged in each pixel region. Each pixel unit 20 may include a pixel electrode 21. Each pixel unit 20 may further include a thin film transistor T1. A first electrode of the thin film transistor T1 is connected to the data line 52, a second electrode of the thin film transistor T1 is connected to the pixel electrode 21, and a control electrode of the thin film transistor T1 is connected to the scanning line 51. The first and second electrodes of the thin film transistor T1 are one of a source electrode and a drain electrode of the thin film transistor T1, respectively. FIG. 5 only schematically shows two scanning lines 51 and two data lines 52, and only shows the thin film transistor T1 of one pixel unit.

Exemplarily, in FIG. 5, the scanning line 51 extends in the first direction and the data line 52 extends in the second direction, that is, the first direction is the extending direction of the scanning line 51 and the second direction is the extending direction of the data line 52. In other embodiments, the scanning line 51 may also extend in the second direction, and the data line 52 may extend in the first direction.

Figure 6:
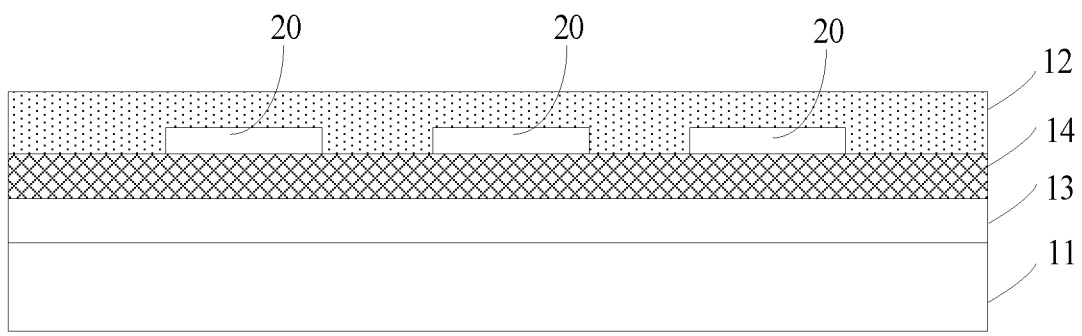
FIG. 6 is a cross-sectional view of a display substrate according to an embodiment of the present disclosure.

FIG. 6 is a cross-sectional view of a display substrate according to an embodiment of the present disclosure. As shown in FIG. 6, the display substrate may include a base substrate 11, a common electrode layer 13 located on the base substrate 11, an insulating layer 14 located on the common electrode layer 13, pixel units 20 located on the insulating layer 14, and an alignment film 12 located on the pixel units 20.

It should be noted that the foregoing scanning lines 51, data lines 52, and pixel units 20 may all be located in the same layer, for example, in an array layer, that is, the array layer has a multilayer structure. The thin film transistor T1 in the array layer may be a bottom-gate structure, a top-gate structure, or a double-gate structure. Different thin film transistors T1 correspond to different hierarchical structures. The embodiment of the present disclosure does not limit the hierarchical structure of the array layer, as long as the foregoing connection relationship is satisfied.

In the embodiment of the present disclosure, the display substrate may be a display substrate of an advanced super dimension switch (ADS) type display device or a display substrate in an in-plane switching (IPS) type display device. In the ADS type display device and the IPS type display device, the pixel electrode is a slit electrode. The pixel electrode and the common electrode are both located on the display substrate, and the liquid crystal molecules are rotated under the action of an electric field approximately parallel to the display substrate. Such type of display devices can be applied to the scenes requiring a larger viewing angle, such as vehicle-mounted display and public display. If the display substrate provided in the embodiment of the present disclosure is applied to such type of display devices, the contrast of a specific orientation can be changed and the display effect is improved. FIG. 6 illustrates the display substrate of the ADS type display device as an example.

It should be noted that the display substrate provided by the embodiment of the present disclosure may also be applied to some other types of display devices, for example, a twisted nematic (TN) type display device. In the TN type display device, the pixel electrode may also be a surface electrode.

Figure 7:
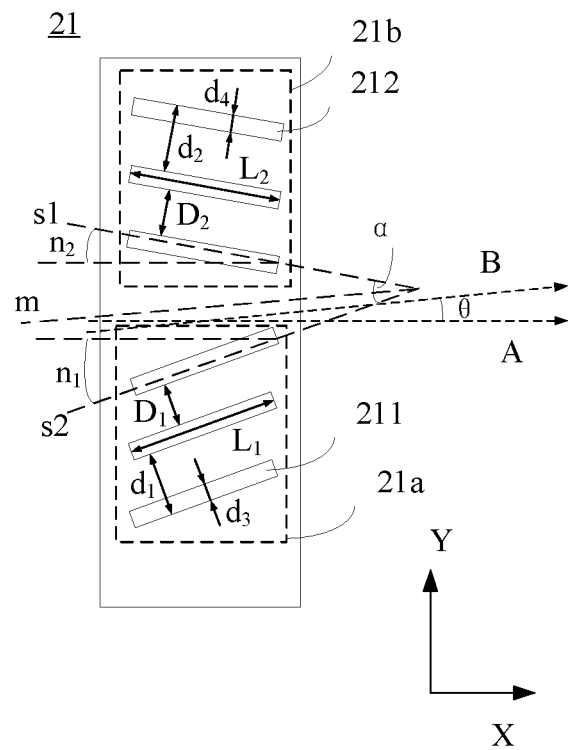
FIG. 7 is an enlarged schematic structural diagram of a pixel electrode in FIG. 5.

FIG. 7 is an enlarged schematic structural diagram of a pixel electrode in FIG. 5. As shown in FIG. 7, the pixel electrode 21 has a plurality of slits (for example the first bar slits 211 and the second bar slits 212 in FIG. 7), that is, the pixel electrode 21 may be a slit electrode. The pixel electrode 21 shown in FIG. 7 has a rectangular shape. In other embodiments, the pixel electrode 21 may also have a parallelogram shape, a rhombus shape, or the like.

In the present embodiment, as shown in FIG. 7, each pixel electrode 21 has a first region 21a and a second region 21b which are arranged in a second direction (i.e., the Y direction). The first region 21a is provided with a plurality of first bar slits 211, and the second region 21b is provided with a plurality of second bar slits 212. The extending direction of the first bar slit 211 and the extending direction of the second bar slit 212 are different. The first bar slits 211 and the second bar slits 212 with different extending directions are disposed in the first region 21a and the second region 21b, so that the problem of picture color difference when the display device is viewed from different directions can be reduced.

Optionally, in other embodiments, the extending direction of the first bar slit 211 and the extending direction of the second bar slit 212 may be the same, so that the light transmittance of the display substrate can be improved, and the display brightness of the display device is increased.

Optionally, the extending direction s1 of the first bar slit 211 and the extending direction s2 of the second bar slit 212 may be symmetrical with respect to the rubbing direction B of the alignment film 12. That is, the angle bisector of an angle between the extending direction of the first bar slit 211 and the extending direction of the second bar slit 212 is parallel to the rubbing direction of the alignment film 12. As shown in FIG. 7, the angle between the extending direction of the first bar slit 211 and the extending direction of the second bar slit 212 is a, and the angle bisector m of the angle $\alpha$ is parallel to the B direction. Exemplarily, the angle between the extending direction of the first bar slit 211 and the X direction (that is, the above first direction) is n1, and the angle between the extending direction of the second bar slit 212 and the X direction is n2. The angle values of the angle n1 and the angle n2 are not equal. The angle values of the angle $\theta$ between the B direction and the X direction, the angle n1 and the angle n2 meet the equation $\theta=0.5(n1-n2)$. The counterclockwise direction being considered as a positive direction is taken as an example, the angle value of the angle n1 is positive, and the angle value of the angle n2 is negative. If the angle value of the angle $\theta$ is a positive number, it means that the 13 direction is rotated counterclockwise with respect to the X direction. If the angle value of $\theta$ is a negative number, it means that the B direction is rotated clockwise with respect to the X direction. The extending direction s1 of the first bar slit 211 and the extending direction s2 of the second bar slit 212 are set to be symmetrical with respect to the rubbing direction B, thereby better reducing the problem of color difference when the display device is viewed from different directions. It should be noted that, since the A direction is consistent with the X direction, for convenience of description, FIG. 7 is schematically illustrated with reference to the A direction.

The angle $\alpha$ between the extending direction s1 of the first bar slit 211 and the extending direction s2 of the second bar slit 212 on each pixel electrode 21 may be equal, thereby facilitating the production of a mask. In addition, since the light transmittance of the liquid crystal layer after a voltage is applied is related to the angle $\alpha$, by setting the angles $\alpha$ between the extending direction of the first bar slits 211 and the extending direction of the second bar slits 212 on all pixel electrodes 21 to be the same value, the liquid crystal layer has the same light transmittance when the voltage of the same size is applied to different pixel electrodes 21.

Exemplarily, the angle $\alpha$ between the extending direction s1 of the first bar slit 211 and the extending direction s2 of the second bar slit 212 may be 10° to 22°. For example, the angle $\alpha$ may be 12°, 15°, 17°, or 20°. That is, the angle $\alpha$ formed between the extending direction of the first bar slit 211 and the extending direction of the second bar slit 212 is an acute angle. After testing, if the angle $\alpha$ between the first bar slit 211 and the second bar slit 212 is too large, the light transmittance of the liquid crystal after the voltage is applied will decrease, which reduces the brightness of the display device.

Optionally, on the same pixel electrode 21, the number of the first bar slits 211 and the number of the second bar slits 212 may be equal. FIG. 7 exemplarily shows three first bar slits 211 and three second bar slits 212. Due to the same number of the first and second bar slits 211 and 212, the problem of color difference when the display device is viewed from different directions can be further reduced, and the display effect is improved.

As shown in FIG. 7, on the same pixel electrode 21, a pitch d1 between any two adjacent first bar slits 211 may be equal to a pitch d2 between any two adjacent second bar slits 212. In this case, an electric field formed by the pixel electrodes 21 may be more symmetrical, and the stress of the liquid crystal may be balanced. Here, the pitch refers to the width of one repeated period of the pattern of the slit electrode, and may be equal to the sum of a width of the bar slit in a direction parallel to the display substrate and the pitch of the bar slit.

Exemplarily, the pitch d1 between any two adjacent first bar slits 211 on the same pixel electrode 21 may be 6 μm to 8 μm.

In addition, the minimum distance D1 between any two adjacent first bar slits 211 may be equal to the minimum distance D2 between any two adjacent second bar slits 212. Both the minimum pitch D1 and the minimum pitch D2 may be 2 μm to 3 μm.

Optionally, in a direction parallel to the display substrate, a width d3 of the first bar slit 211 and a width d4 of the second bar slit 212 may be also equal.

Exemplarily, the width d3 of the first bar slit 211 may be 4 μm to 5 μm. If the width d3 of the first bar slit 211 is too small, the etching difficulty is larger, which will increase the manufacturing cost. If the width d3 of the first bar slit 211 is too large, when the pitch d1 between adjacent first bar slits 211 on the same pixel electrode 21 is constant, the resistance of the pixel electrode 21 increases.

Optionally, a length L1 of the first bar slit 211 and a length L2 of the second bar slit 212 may be equal. At this time, the first bar slit 211 and the second bar slit 212 are symmetrical with respect to the angle bisector m.

In other embodiments, the length L1 of the first bar slit 211 and the length L2 of the second bar slit 212 may not be equal. For example, when the angle n1 between the extending direction s1 of the first bar slit 211 and the A direction is greater than the angle n2 between the extending direction s2 of the second bar slit 212 and the A direction, the length of the first bar slit 211 may be set longer than that of the second bar slit 212.

Figure 8:
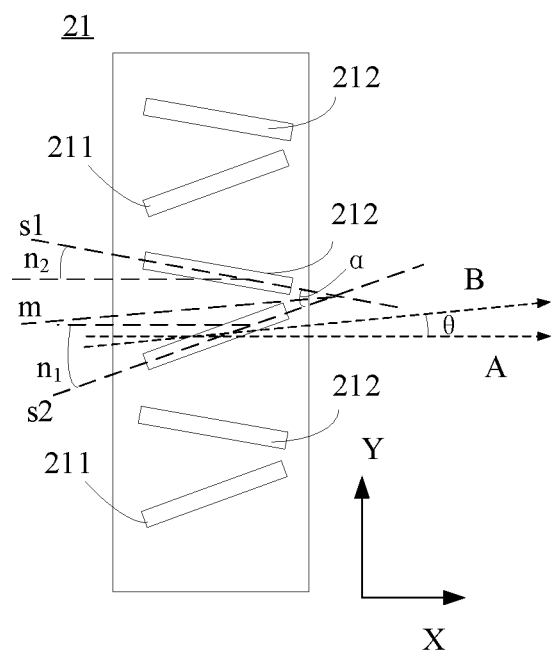
FIG. 8 is a schematic structural diagram of another pixel electrode according to an embodiment of the present disclosure.

FIG. 8 is a schematic structural diagram of another pixel electrode according to an embodiment of the present disclosure. As shown in FIG. 8, the pixel electrode 21 has a plurality of first bar slits 211 and a plurality of second bar slits 212. The plurality of first bar slits 211 and the plurality of second bar slits 212 are alternately arranged at an interval in the second direction (for example, the Y direction in FIG. 8), and the extending directions of the first bar slits 211 and the second bar slits 212 are different.

In the embodiment shown in FIG. 8, the extending direction s1 of the first bar slit 211 and the extending direction s2 of the second bar slit 212 may also be symmetrical with respect to the rubbing direction B. The content about the extending directions of the first bar slit 211 and the second bar slit may refer to related content of the embodiment shown in FIG. 7, and detailed description is omitted here.

Exemplarily, in the pixel electrode 21, the number of the first bar slits 211 and the number of the second bar slits 212 may be equal. The interval between any two adjacent first bar slits 211 may be equal to the interval between any two adjacent second bar slits 212, and the width of the first bar slit 211 and the width of the second bar slit 212 may also be equal.

Figure 9:
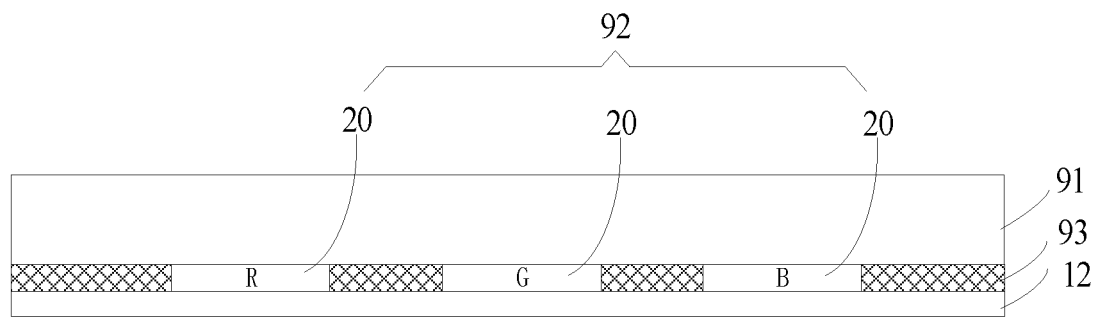
FIG. 9 is a schematic structural diagram of another display substrate according to an embodiment of the present disclosure.

Optionally, in other embodiments, the display substrate may be a color filter substrate. FIG. 9 is a schematic structural diagram of another display substrate according to an embodiment of the present disclosure. The display substrate in FIG. 9 is a color filter substrate. As shown in FIG. 9, the color filter substrate includes a base substrate 91, a color filter layer 92 located on the base substrate 91, and an alignment film 12 located on the color filter layer 92.

The color filter layer 92 may include a plurality of pixel units 20 arranged in an array, and the pixel unit 20 may include a color photoresist block. For example, a red color photoresist block, a blue color photoresist block, or a yellow color photoresist block may be included.

In addition, when the display substrate is a color filter substrate, the display substrate may further include black matrixes (BM) 93, and the black matrixes 93 are located between the pixel units 20.

Exemplarily, in the embodiment of the present disclosure, the alignment film 12 may be a poly imide polyimide (PI) film.

Figure 10:
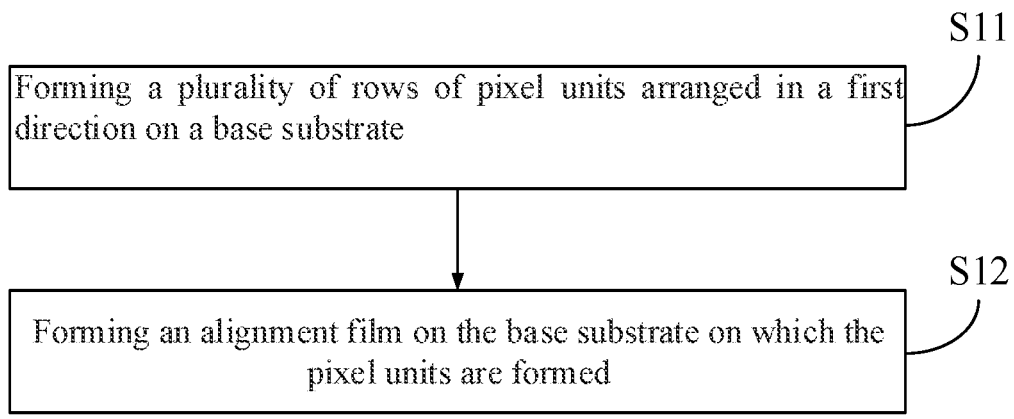
FIG. 10 is a flowchart of a method for manufacturing a display substrate according to an embodiment of the present disclosure.

FIG. 10 is a flowchart of a method for manufacturing a display substrate according to an embodiment of the present disclosure. The method is configured to manufacture the display substrate shown in FIG. 3. As shown in FIG. 10, the manufacturing method includes the followings steps.

In step S11, a plurality of rows of pixel units arranged in a first direction are formed on a base substrate.

Each row of pixel units includes a plurality of pixel units arranged in a second direction, and the second direction intersects with the first direction. For example, the second direction is perpendicular to the first direction, or the second direction is approximately perpendicular to the first direction. The distribution of the pixel units may refer to FIG. 5.

The pixel unit may include a pixel electrode, or the pixel unit may also include a color photoresist block. The related content may refer to the foregoing embodiment. The base substrate may be a transparent substrate, for example a glass substrate.

In step S12, an alignment film is formed on the base substrate on which the pixel units are formed.

The angle between a rubbing direction of the alignment film and the first direction is an acute angle. The rubbing direction of the alignment film may refer to FIG. 3.

Optionally, a liquid crystal aligning agent (for example, a PI material) may be coated on the base substrate on which the pixel units are formed, then the liquid crystal aligning agent is cured to form the alignment film, and then the already-cured alignment film is subjected to rubbing orientation to obtain a manufactured display substrate.

The embodiment of the present disclosure further provides a display device including a first substrate, and the first substrate may be the display substrate shown in FIG. 3 or FIG. 9.

The display device may be a liquid crystal display panel. Exemplarily, the liquid crystal display panel may be a display panel of any product having a display function, such as a mobile phone, a tablet computer, a television, a display, a notebook computer, a digital photo frame and a navigator. Exemplarily, the display device may also be a vehicle-mounted display device. When driving a vehicle, a driver usually views the display device from a fixed angle. By applying such a display substrate to the vehicle-mounted display device, the contrast of the display device at an angle viewed by the driver and/or a co-driver is changed, and the display effect of the vehicle-mounted display device can reach a higher standard, for example, the German5.0 standard.

The display device may further include a second substrate opposite to the first substrate, and a liquid crystal layer located between the first substrate and the second substrate, Exemplarily, the first substrate may be an array substrate, and the second substrate may be a color filter substrate. The array substrate is disposed opposite to the color filter substrate.

Figure 11:
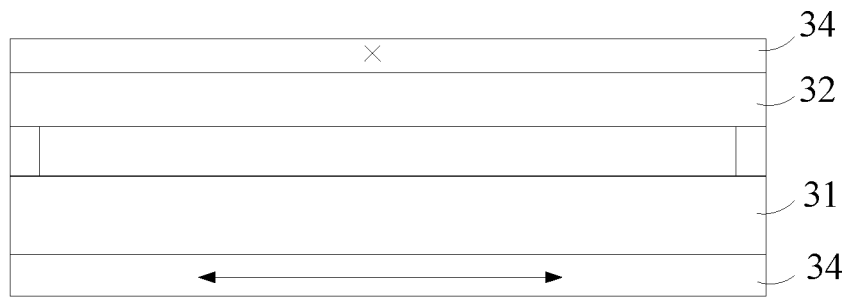
FIG. 11 is a schematic structural diagram of a display device according to an embodiment of the present disclosure.

FIG. 11 is a schematic structural diagram of a display device according to an embodiment of the present disclosure. As shown in FIG. 11, the display device includes an array substrate 31 and a color filter substrate 32. The color filter substrate 32 is disposed opposite to the array substrate 31. The array substrate 31 may be the display substrate as shown in FIG. 6, and the color filter substrate 32 may be a color filter substrate as shown in FIG. 9.

Optionally, the second substrate may include an alignment film, and the rubbing direction of the alignment film of the second substrate may be the same as the rubbing direction of the alignment film of the first substrate. For example, the first substrate is the array substrate 31 and the second substrate is the color filter substrate 32. The rubbing direction of the alignment film of the color filter substrate 32 is the same as the rubbing direction of the alignment film of the array substrate 31. In the IPS type display device and the ADS type display device, the rubbing direction of the alignment film of the color filter substrate 32 and the rubbing direction of the alignment film of the array substrate 31 are set to the same direction, so that when no voltage is applied to the pixel electrode, the liquid crystal molecules between the color filter substrate 32 and the array substrate 31 can be aligned in the same direction.

Alternatively, the rubbing direction of the alignment film of the color filter substrate 32 and the rubbing direction of the alignment film of the array substrate 31 may also form an angle therebetween, and for example, may be perpendicular to each other. In the TN type display device, the angle between the rubbing direction of the alignment film of the color filter substrate 32 and the rubbing direction of the alignment film of the array substrate 31 is set to a non-zero angle, so that when no voltage is applied to the pixel electrode 21, the plurality of liquid crystal molecules arranged in the direction perpendicular to the array substrate 31 gradually change in arrangement direction and are arranged in a twisted form.

As shown in FIG. 11, the display device may further include two polarizers 34 opposite to each other. The array substrate 31 and the color filter substrate 32 are located between the two polarizers 34. The absorption axes of the two polarizers 34 are perpendicular to each other (in FIG. 10, the absorption axis of the lower polarizer 34 is in the direction of the double arrows, and the absorption axis of the upper polarizer 34 is perpendicular to the paper surface direction). The absorption axis of one of the two polarizers 34 is the same as the rubbing direction of the alignment film of the array substrate 31. By disposing the polarizers 34, the absorption axis of one of the polarizers 34 and the alignment direction of the alignment film of the array substrate 31 are the same, so that the backlight of the display device passes through the polarizers 34 to form linearly polarized light and then enters the liquid crystal layer.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A display substrate, comprising an alignment film and a plurality of rows of pixel units arranged in a first direction, wherein, each row of pixel units comprises a plurality of pixel units arranged in a second direction, the second direction intersects with the first direction, and an angle between a rubbing direction of the alignment film and the first direction is 1° to 2°;
    wherein each of the pixel units comprises a pixel electrode, and the pixel electrode is a slit electrode, wherein an angle between an extending direction of a slit of the slit electrode and the first direction is less than an angle between the extending direction of the slit of the slit electrode and the second direction.

2. The display substrate according to claim 1, wherein each of the pixel electrodes has a first region and a second region which are arranged in the second direction, the first region is provided with a plurality of first bar slits the second region is provided with a plurality of second bar slits, and an extending direction of the first bar slit is different from an extending direction of the second bar slit.

3. The display substrate according to claim 1, wherein each of the pixel electrodes has a plurality of first bar slits and a plurality of second bar slits, the plurality of first bar slits and the plurality of second bar slits are alternately arranged at an interval in the second direction, and an extending direction of the first bar slit is different from an extending direction of the second bar slit.

4. The display substrate according to claim 2, wherein the extending direction of the first bar slit and the extending direction of the second bar slit are symmetric with respect to the rubbing direction of the alignment film.

5. The display substrate according to claim 4, wherein the angle between the extending direction of the first bar slit and the extending direction of the second bar slit on each of the pixel electrodes is equal.

6. The display substrate according to claim 5, wherein the angle between the extending direction of the first bar slit and the extending direction of the second bar slit is 10° to 22°.

7. The display substrate according to claim 5, wherein on the same pixel electrode, a pitch between any two adjacent first bar slits is equal to a pitch between any two adjacent second bar slits.

8. The display substrate according to claim 7, wherein the pitch between any two adjacent first bar slits on the same pixel electrode is 6 μm to 8 μm.

9. The display substrate according to claim 7, wherein in a direction parallel to the display substrate, a width of the first bar slit is equal to a width of the second bar slit.

10. The display substrate according to claim 9, wherein the width of the first bar slit is 4 μm to 5 μm.

11. The display substrate according to claim 9, wherein a length of the first bar slit is equal to a length of the second bar slit.

12. The display substrate according to claim 11, further comprising: a base substrate, a common electrode layer located on the base substrate, and an insulating layer located on the common electrode layer, wherein the pixel units and the alignment film are sequentially located on the insulating layer.

13. The display substrate according to claim 1, wherein each of the pixel units comprises a color photoresist block.

14. The display substrate according to claim 4, the display substrate further comprising:

a base substrate, a common electrode layer located on the base substrate, an insulating layer located on the common electrode layer, and an array layer and the alignment film which are located on the insulating layer in sequence; wherein the array layer comprises a plurality of scanning lines, a plurality of data lines, and the plurality of rows of pixel units arranged in a first direction, and the plurality of data lines intersect with each other to define a plurality of pixel regions, and each pixel region has one pixel unit;

each of the pixel units comprises a thin film transistor and the pixel electrode, a first electrode of the thin film transistor is connected to the data line, a second electrode of the thin film transistor is connected to the pixel electrode, a control electrode of the thin film transistor is connected to the scanning line, and the first electrode and the second electrode are one of a source electrode and a drain electrode respectively.

15. A display device comprising a first substrate, wherein the first substrate comprises an alignment film and a plurality of rows of pixel units arranged in a first direction, wherein, each row of pixel units comprises a plurality of pixel units arranged in a second direction, the second direction intersects with the first direction, and an angle between a rubbing direction of the alignment film and the first direction is 1° to 2°;

wherein each of the pixel units comprises a pixel electrode, and the pixel electrode is a slit electrode, wherein an angle between an extending direction of a slit of the slit electrode and the first direction is less than an angle between the extending direction of the slit of the slit electrode and the second direction.

16. The display device according to claim 15, further comprising a second substrate opposite to the first substrate, wherein the second substrate comprises an alignment film, and a rubbing direction of the alignment film of the second substrate is the same as a rubbing direction of the alignment film of the first substrate.

17. The display device according to claim 16, further comprising two polarizers disposed opposite to each other, wherein the first substrate and the second substrate are located between the two polarizers, absorption axes of the two polarizers are perpendicular to each other, and an absorption axis of one of the two polarizers is the same as the rubbing direction of the alignment film of the first substrate.

18. A method for manufacturing a display substrate, comprising:

forming a plurality of rows of pixel units arranged in a first direction on a base substrate, each row of pixel units comprising a plurality of pixel units arranged in a second direction, the second direction intersecting with the first direction; and forming an alignment film on the base substrate, an angle between a rubbing direction of the alignment film and the first direction being 1° to 2°;

wherein each of the pixel units comprises a pixel electrode, and the pixel electrode is a slit electrode, wherein an angle between an extending direction of a slit of the slit electrode and the first direction is less than an angle between the extending direction of the slit of the slit electrode and the second direction.

19. The display substrate according to claim 4, wherein the alignment film is configured to rotate liquid crystal molecules in a liquid crystal layer adjacent to the display substrate by 1° to 2° with respect to the first direction in a plane parallel to the display substrate, and wherein a figure formed by iso-contrast lines generated by the display substrate in a contrast test is not a symmetrical figure.

* * * * *